United States Patent
Delavaux et al.

(10) Patent No.: US 11,276,982 B2
(45) Date of Patent: Mar. 15, 2022

(54) OPTICAL FIBER AMPLIFIER FOR OPERATION IN TWO MICRON WAVELENGTH REGION

(71) Applicant: Cybel, LLC., Bethlehem, PA (US)

(72) Inventors: Jean-Marc Delavaux, Pittstown, NJ (US); Robert E. Tench, Allentown, PA (US); Clement Romano, Strasburg (FR)

(73) Assignee: Cybel, LLC., Bethlehem, PA (US)

( * ) Notice: Subject to any disclaimer, the term of this patent is extended or adjusted under 35 U.S.C. 154(b) by 190 days.

(21) Appl. No.: 16/749,084

(22) Filed: Jan. 22, 2020

(65) Prior Publication Data
US 2021/0226403 A1  Jul. 22, 2021

(51) Int. Cl.
*H01S 3/00* (2006.01)
*H01S 3/067* (2006.01)
*H01S 3/094* (2006.01)
*H01S 3/16* (2006.01)

(52) U.S. Cl.
CPC .... *H01S 3/06733* (2013.01); *H01S 3/094003* (2013.01); *H01S 3/161* (2013.01); *H01S 3/1616* (2013.01)

(58) Field of Classification Search
None
See application file for complete search history.

(56) References Cited

U.S. PATENT DOCUMENTS

| | | | |
|---|---|---|---|
| 7,313,306 B2 | 12/2007 | Yamada et al. | |
| 7,957,433 B2 | 6/2011 | Jiang et al. | |
| 8,121,154 B2 | 2/2012 | Jiang et al. | |
| 8,611,003 B2 | 12/2013 | Ahn et al. | |
| 9,466,939 B2 | 10/2016 | Moulton et al. | |
| 9,780,520 B2 | 10/2017 | Jiang et al. | |
| 9,882,341 B2 | 1/2018 | Gapontsev et al. | |
| 10,348,051 B1* | 7/2019 | Shah | G01S 17/34 |
| 2009/0257116 A1 | 10/2009 | Sweeney et al. | |
| 2011/0222562 A1* | 9/2011 | Jiang | H01S 3/067 372/6 |
| 2013/0278997 A1* | 10/2013 | Liu | H01S 3/067 359/341.3 |
| 2016/0218478 A1 | 7/2016 | Jiang et al. | |
| 2017/0352999 A1* | 12/2017 | Cormier | H01S 3/0092 |
| 2018/0159296 A1* | 6/2018 | Johnson | H01S 3/06758 |

FOREIGN PATENT DOCUMENTS

CN      102986096 A  *  3/2013  ............... H01S 3/10

* cited by examiner

*Primary Examiner* — Mark Hellner
(74) *Attorney, Agent, or Firm* — Wendy W. Koba, Esq.

(57) ABSTRACT

A doped fiber amplifier is proposed that includes both a Ho-doped amplifier (used as a preamplifier) and a Tm-doped amplifier (used as a power amplifier). The Ho-doped preamplifier typically uses a single clad (SC) optical fiber as the gain element, with both the propagating signal and pump beam introduced into the Ho-doped core of the SC fiber. The Tm-doped power amplifier typically utilizes a double clad (DC) optical fiber as the gain element, which allows for a multimode pump to propagate within the Tm-doped core region and inner cladding, providing efficient high power amplification of the signal received at its input.

18 Claims, 7 Drawing Sheets

OPTICAL FIBER AMPLIFIER FOR OPERATION IN TWO MICRON WAVELENGTH REGION

TECHNICAL FIELD

The present invention relates to rare-earth doped fiber amplifiers and, more particularly, to a hybrid fiber amplifier particularly configured to provide output power in excess of 25 W within the 2 μm wavelength region.

BACKGROUND

There is a continuing need to develop optical systems that are capable of operating in the eye-safe 1.90-2.15 μm wavelength range. Applications such as LIDAR, atmospheric sensing (e.g., $CO_2$), WDM communication systems, and the like, are among those that will need to rely on high performance optical devices that operate within this 2 μm wavelength region. The ability to provide a sufficient amount of signal power for these applications necessitates the development of amplifiers and high power laser sources. To date, multiwatt Thulium-doped fiber amplifiers (TDFAs) have been one option for providing signal gain in this 2 μm wavelength band, with at least one TDFA having been configured to provide an output power of about 600 W at the usable wavelength of 2040 nm. Another approach utilizes a Holmium-doped fiber amplifier (HDFA), and has been found to yield an output power of about 265 W at a wavelength of 2110 μm.

While both TDFAs and HDFAs may be able to provide acceptable output power levels at these particular wavelengths, they have to date been found to be somewhat limited in terms of operating wavelength(s) that may be utilized, and may also exhibit a limited dynamic range for input signal power. The particular design of the HDFA approach requires a complex pump scheme using multiple pump source inputs to a double-clad Ho-doped gain fiber, which may limit its efficiency. Additionally, the noise figure of these amplifier designs has not yet been fully evaluated.

Thus, a need remains for a low noise, high input signal dynamic range optical amplifier that operates efficiently, providing high small signal gain and high output power across an extended region of the eye-safe 1.90-2.15 μm wavelength band.

SUMMARY OF THE INVENTION

The needs remaining in the art are addressed by the present invention, which relates to rare-earth doped fiber amplifiers and, more particularly, to a hybrid fiber amplifier particularly configured to provide output power in excess of 25 W within the 2 μm wavelength region.

In accordance with the principles of the present invention, a doped fiber amplifier is proposed that includes both a Ho-doped amplifier (used as a preamplifier) and a Tm-doped amplifier (used as a power amplifier). The Ho-doped preamplifier typically uses a single clad (SC) optical fiber as the gain element, with both the propagating signal and pump beam introduced into the Ho-doped core of the SC fiber. The Tm-doped power amplifier typically utilizes a double clad (DC) optical fiber as the gain element, which allows for a multimode pump to propagate within the Tm-doped core region and inner cladding, providing efficient high power amplification of the signal received at its input.

Exemplary embodiments of the present invention are based upon the use of a Ho-doped preamplifier to create a relatively high input signal dynamic range (while maintaining a low noise figure value), with the Tm-doped power amplifier configured to provide the desired amount of gain or power to this "high dynamic range" preamplifier output. High gain amplifier configurations in the 2 μm wavelength region are particularly well-suited for applications employing pulsed input sources, whose average input power is typically −20 dBm or less. The maximum achievable output power is considered to be limited only by the amount of pump power that can be introduced into the Tm-doped gain fiber.

The inventive hybrid amplifier is intended to be of particular use in a master oscillator power amplifier (MOPA) configuration, with the HDFA preamplifier functioning as the seed laser input for the (TDFA) power amplifier. The HDFA preamplifier may be used in either a CW or pulse mode as the seed laser source for the MOPA.

Both the Ho-doped preamplifier and the Tm-doped power amplifier may utilize a co-propagating pump arrangement, a counter-propagating pump arrangement, or a combination of both co- and counter-propagating pump sources. In some embodiments, the gain fiber of the power amplifier may be co-doped with both Tm and Ho.

The amplifier elements may be formed of either standard single mode optical fiber (i.e., non-polarization-maintaining), or fiber of polarization-maintaining construction. For applications that operate with a single polarization signal, polarization-maintaining fiber is preferably used in order to maintain the orientation of the propagating signal along a designated axis without the need for additional polarization controlling elements.

An exemplary embodiment of the present invention may take the form of an optical amplifier for operation at an eye-safe signal wavelength $\lambda_S$ within the 2 μm region, the amplifier comprising a preamplifier element and a power amplifier element. The preamplifier element is formed of one or more Ho-doped fiber amplifier components and the power amplifier element is coupled to the output of the preamplifier element and is formed of one or more Tm-doped fiber amplifier components.

Other and further embodiments and features of the present invention will become apparent during the course of the following discussion and by reference to the related drawings.

BRIEF DESCRIPTION OF THE DRAWINGS

Referring now to the drawings, where like numerals represent like parts in several views.

DETAILED DESCRIPTION

Figure 1:
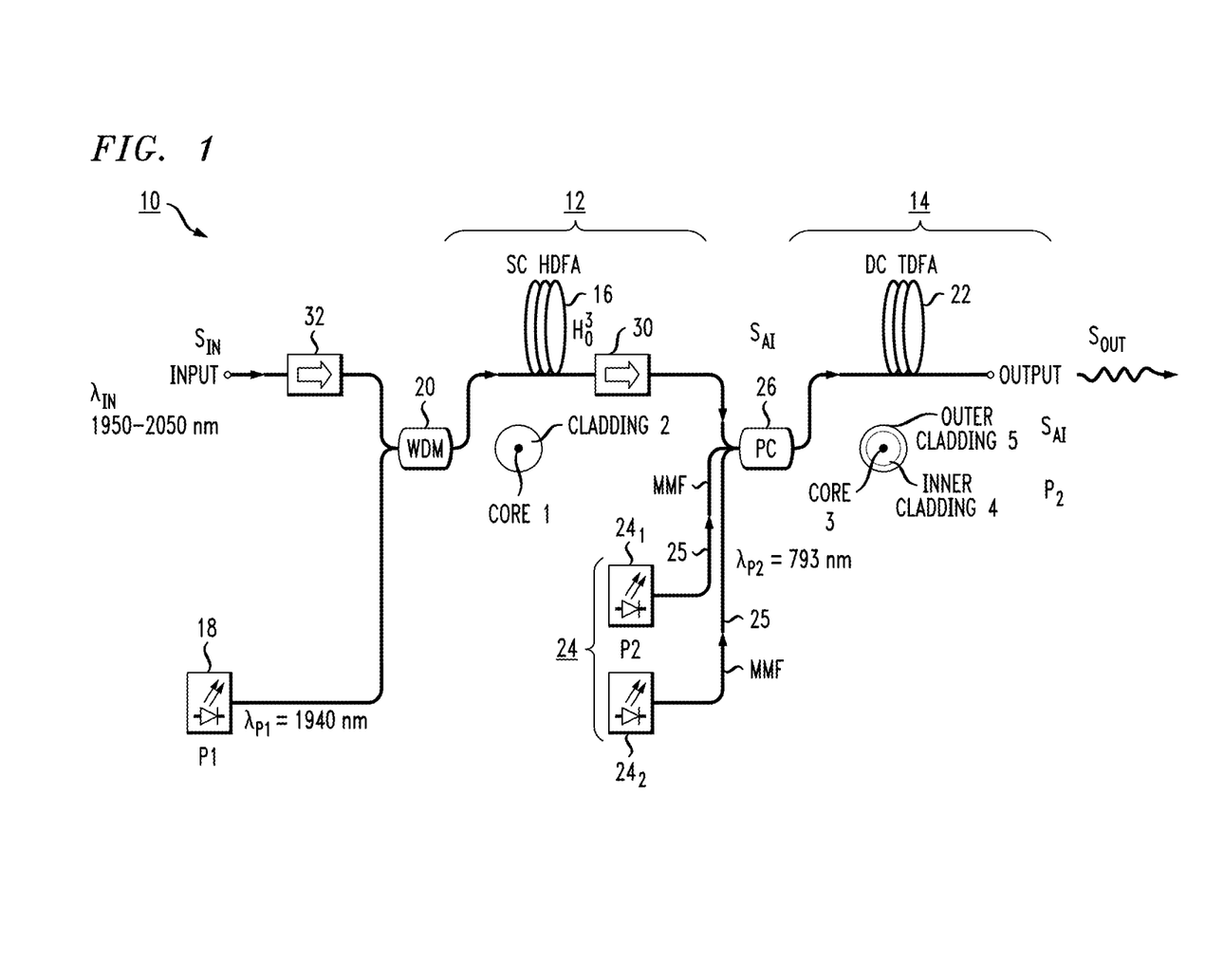
FIG. 1 illustrates an exemplary embodiment of a hybrid optical fiber amplifier formed in accordance with the principles of the present invention.

FIG. 1 illustrates an exemplary hybrid fiber amplifier 10 formed in accordance with the principles of the present invention. Here, the term "hybrid" is used to describe the use of two different rare-earth dopants (Ho and Tm), in two separate amplifiers, to provide amplification of a propagating input signal. As mentioned above, the inventive fiber amplifier is particularly designed to operate within an eye-safe wavelength range (e.g., from about 2.0-2.1 µm), illustrated in FIG. 1 as an input optical signal ($S_{IN}$) operating at a wavelength $\lambda_{IN}$ within this range.

Hybrid fiber amplifier 10 is shown as comprising a preamplifier 12 that is followed by a power amplifier 14, with each amplifier in this embodiment having a single amplifying stage. Other embodiments, as will be discussed in detail below, may utilize a multi-stage preamplifier and/or a multi-stage power amplifier, as best suited for specific applications.

Preamplifier 12 includes a section of single clad (SC) Ho-doped fiber 16, where the inset depicts the "single clad" cross-section as including a Ho-doped core region 1 and a surrounding cladding layer 2. The incorporation of Ho dopant into the silica core of an SC fiber is known in the art to provide amplification of a propagating light signal in the presence of a pump beam operating at an appropriate wavelength. For the purposes of the present invention, the use of an eye-safe input signal $S_{IN}$ within the range of about 2.0-2.1 µm allows for a pump beam operating at a pump wavelength (denoted $\lambda_{P1}$) within an absorption band of Ho (for example, $\lambda_{P1}$ of about 1940 nm) to react with the Ho ions in a manner that imparts gain to input signal $S_{IN}$.

It is to be understood that the use of a preamplifier pump at the wavelength of 1940 nm is only one of several choices to provide amplification in the presence of Ho ions. Other pump wavelengths, corresponding to other absorption bands of Ho may be used in the HDFA preamplifier of the present invention (e.g., $\lambda_{P1}$ in the range of about 1125-1150 nm, or about 1230 nm, etc.). Moreover, it has been found that increasing the pump wavelength to 2000 nm or greater shifts the spectral operating band of the preamplifier to markedly higher wavelengths, enabling access to higher output wavelengths with significant power in the region of about 2130 nm.

Continuing with the description of hybrid amplifier 10, a preamplifier pump source 18 is shown as associated with preamplifier 12 and is used to deliver a first pump input $P_1$ (here, shown as $\lambda_{P1}$=1940 nm) to core region 1 of Ho-doped gain fiber 16. A wavelength division multiplexer (WDM) 20 is used as a signal combiner at the input of preamplifier 12, coupling both input signal $S_{IN}$ and pump $P_1$ into core region 1 of single clad Ho-doped fiber 16. It is contemplated that a "single clad" fiber is acceptable for use in preamplifier 12, which is focused primarily on creating gain for input signals across a relatively high dynamic range while maintaining a relatively low noise figure (NF). Thus, both $S_{IN}$ and $P_1$ are directly coupled into core region 1 of single clad Ho-doped fiber 16, where the relative refractive index of cladding layer 2 with respect to core region 1 functions to confine both the signal and the pump within the Ho-doped core region.

As is well known in the field of doped fiber amplifiers, the pump beam interacts with the Ho ions within the core region to impart gain to the propagating signal. Parameters such as the dopant concentration, pump power, and length of the gain fiber may all be controlled to create an amplified output signal with the desired high dynamic range characteristic. The ability to provide at least a moderate level of amplification over a wide dynamic range is important, since most semiconductor laser diodes that emit in the eye-safe signal wavelength range are limited in the amount of power they are able to generate.

A first amplified output $S_{A1}$ from preamplifier 12 of hybrid amplifier 10 is shown in FIG. 1 as being applied as a signal input to power amplifier 14. Power amplifier 14 includes a section of Tm-doped, double-clad (DC) gain fiber 22 (alternatively, a section of triple-clad (TC) fiber may be used in the formation of gain fiber 22). Double-clad optical fiber is known to comprise a doped core region that is surrounded by an inner cladding layer, with an outer cladding layer disposed to surround the inner cladding layer. An inset adjacent to gain fiber 22 illustrates this DC form, where the Tm dopant is incorporated within a core region 3, which is surrounded by an inner cladding layer 4. An outer cladding layer 5 (of lower refractive index) is used to confine a propagating multimode pump beam within the combination of core region 3 and inner cladding layer 4.

As shown, the incoming first amplified signal $S_{A1}$ is directly coupled into Tm-doped core region 3. An associated pump source typically provides a multimode pump beam that is coupled into inner cladding 4 in a manner that allows for the pump to overlap with the signal propagating in the core in a manner that efficiently generates gain within first amplified signal $S_{A1}$. In order to provide a relatively high power amplified output (e.g., output power of 25 W or more), a multiwatt pump source 24 is used to provide amplification of incoming first amplified signal $S_{A1}$.

The particular embodiment of power amplifier 14 as shown in FIG. 1 utilizes a pair of multiwatt pump sources $24_1$ and $24_2$, essentially doubling the pump power used to amplify the propagating signal. Pump sources $24_1$, $24_2$ are selected to operate at a wavelength that enables amplification in the presence of the Tm dopant within gain fiber 22. For example, a pump wavelength $\lambda_{P2}$ of about 793 nm may be used to excite the Tm ions within the three-level structure of Tm, providing an efficient "two-for-one" creation of gain within the propagating signal $S_{A1}$. A pump combiner 26 is used to couple together pump beams $P_2$ (which are propagating along sections of multimode fiber 25), and thereafter direct this pump light into inner cladding layer 4 of DC Tm-doped gain fiber 22.

It is to be understood that the pump combiner arrangement of FIG. 1 is exemplary only and that other configurations may used to couple multiple (i.e., more than two) pump sources into the double-clad (or triple-clad) Tm-doped power amplifier to increase the available level of multiwatt pump power (for example, providing pump powers of at least 50 W). The use of high power pump sources is known to result in the ability to provide higher level of available output power in the amplified signal exiting the hybrid amplifier configuration.

Power amplifier 14 is used to efficiently create the majority of signal power, taking full advantage of highly efficient ion-ion interactions associated with the use of Tm dopant, with the possibility of scaling up the output power to levels in excess of 25 W by adding more pump sources to the arrangement using a pump combiner in the manner described above (and/or increasing the power generated by these pump sources 24). Increases in output power may also be obtained by using multiple amplifying stages in the power amplifier, as discussed below in association with the embodiment of FIG. 9.

Isolators 30, 32, and 34 are included in the particular configuration as shown in FIG. 1, and function to suppress backward amplified spontaneous emission (ASE), preventing self-lasing that may otherwise be caused by residual reflections, and ensure unidirectional operation of hybrid amplifier 10. When operated with a pulsed input (for example, in a MOPA configuration), inter-amplifier isolator 32 may take the form of a circulator having a notch filter at the propagating signal wavelength $\lambda_S$ and thus substantially minimize the amount of ASE that continues to propagate in the forward direction through hybrid amplifier 10.

Figure 2:
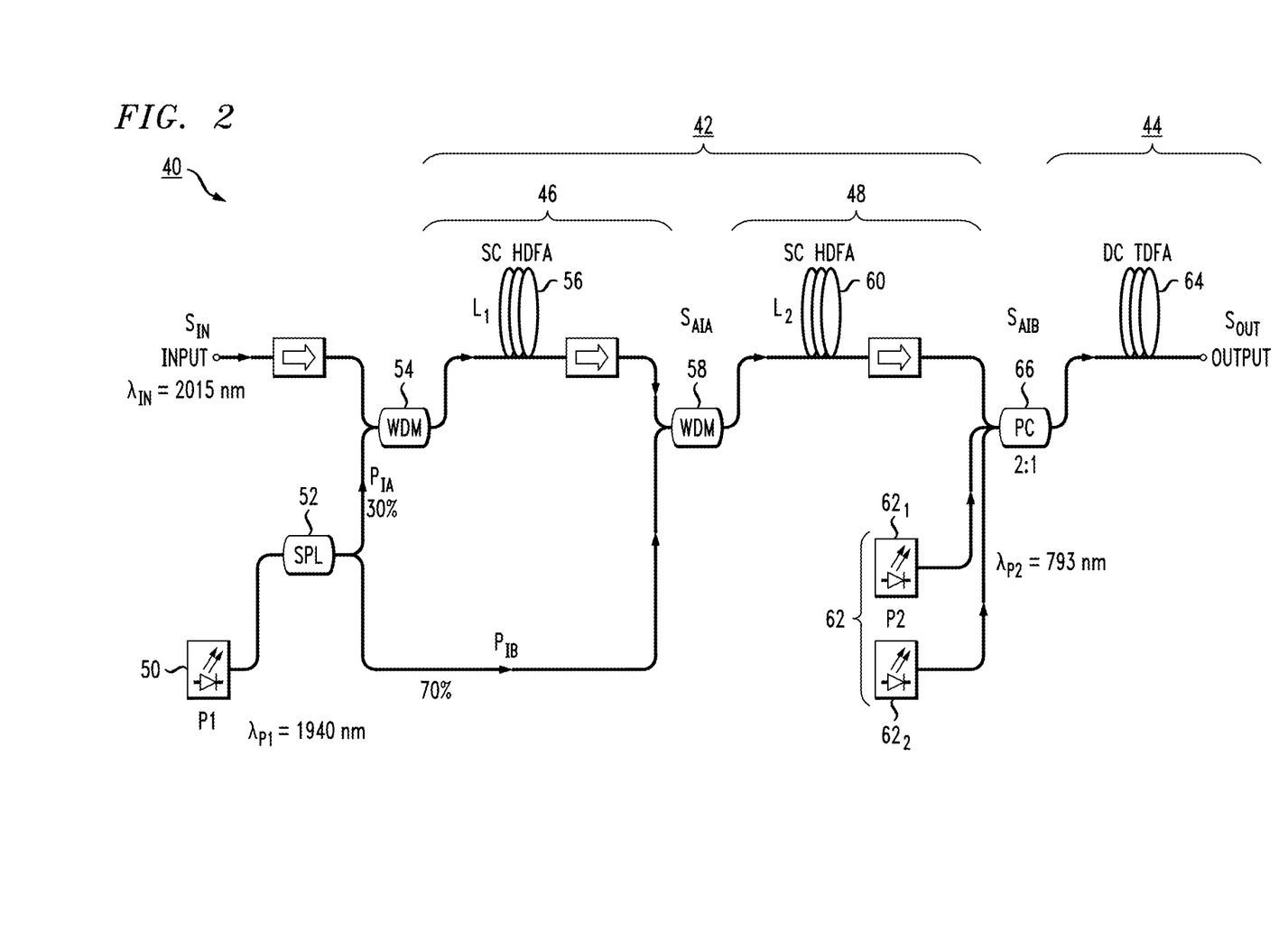
FIG. 2 shows an alternative embodiment of the present invention, comprising a multi-stage preamplifier component that is used in combination with a single stage power amplifier, where the use of more than one stage in the preamplifier allows for optimization of both dynamic range and noise figure of the preamplifier.

FIG. 2 illustrates an alternative embodiment of the present invention. Here, a hybrid fiber amplifier 40 is shown as including a multi-stage preamplifier 42 that is used in combination with a single stage power amplifier 44. In this particular configuration, multi-stage preamplifier 42 comprises a pair of concatenated amplifier stages 46, 48, with each amplifier stage taking the form of a single clad HDFA. A single pump source 50 is used in this particular arrangement to supply the pump light input at $\lambda_{P1}$ to both first stage 46 and second stage 48 (alternatively, it is to be understood that each stage may include its own pump source, operating at a power appropriate for that stage).

A power splitter 52 is used in this particular embodiment to control the ratio of pump powers within the preamplifier stages, creating two separate pump beams. A first pump beam PIA output from power splitter 52 (operating at a first power level $P_{P1A}$) is provided as the pump input to first stage 46, with a second beam $P_{1B}$ (operating at a second power level $P_{P1A}$) provided as the the input source for second stage 48 (where the sum of $P_{P1A}$ and $P_{P1B}$ is ideally equal to the input power $P_{P1}$ of pump source 50).

Referring now in particular to first preamplifier stage 46, the incoming signal $S_{IN}$ and first pump beam $P_{1A}$ are provided as inputs to a first WDM 54, which directs both beams along a common output fiber, which in this case is a first section of single clad Ho-doped gain fiber 56 (having a length $L_1$). The output from first preamplifier stage 46, designated $S_{A1A}$, is then provided as an input (amplified) signal to second preamplifier stage 48. As shown, a second WDM 58 is disposed to receive this amplified signal $S_{A1A}$, as well as the larger portion ($P_{1B}$) of the pump beam. The combination of these two lightwaves is then coupled into a second section of single clad Ho-doped gain fiber 60 (having a length $L_2$).

In this exemplary embodiment, the two preamplifier stages are separately optimized, in terms of gain fiber length and applied pump power, such that one stage provides maximum gain (for example, first stage 46) and the other stage provides maximum power (here, second stage 48). One particular configuration that exemplifies this optimization may use a first stage gain fiber 56 with $L_1$=3.0 m, pumped with 30% of the total pump power, in combination with a second stage gain fiber 60 of length $L_2$=2.0 m, receiving 70% of the pump power. As will be discussed in detail below in association with FIGS. 3-8, the use of a multi-stage preamplifier with these exemplary values is able to respond to relatively low power input signals (e.g., on the order of -20 dBm) and is further able to create a moderate amount of gain within such low-power inputs.

Turning now to power amplifier stage 44 of hybrid fiber amplifier 40, a pump source 62 is shown as including a pair of multiwatt pump light sources $62_1$ and $62_2$ (similar to the arrangement shown in FIG. 1). In particular, each source $62_1$ and $62_2$ provides a multimode output at the desired pump wavelength $\lambda_{P2}$ of 793 nm, providing amplification within a section of double clad Tm-doped gain fiber 64. As with the configuration discussed above in association with FIG. 1, a pump combiner 66 is used to combine the separate outputs from pump source $62_1$ and $62_2$, providing their combination as an input to the inner cladding/core combination of gain fiber 64. The amplified output $S_{A1B}$ from preamplifier 42 is coupled into the Tm-doped core region of gain fiber 64. The combination of the pump beam and signal within Tm-doped gain fiber 64 provides the final amplified output signal from fiber amplifier 40, shown as amplified output signal $S_{OUT}$ in FIG. 2.

For the purpose of understanding the information presented in following FIGS. 3-8, the power of input signal $S_{IN}$ is defined as "$P_S$", and the generated power of output $S_{OUT}$ is defined as "$P_{OUT}$". With reference to the embodiment of FIG. 2, $P_S$ is measured at the input of Ho-doped gain fiber 56, and $P_{OUT}$ is measured at the output of Tm-doped gain fiber 64. The total pump input power for preamplifier 42 is designated $P_{P1}$, and the total pump input power for power stage 44 is designated $P_{P2}$.

Figure 3:
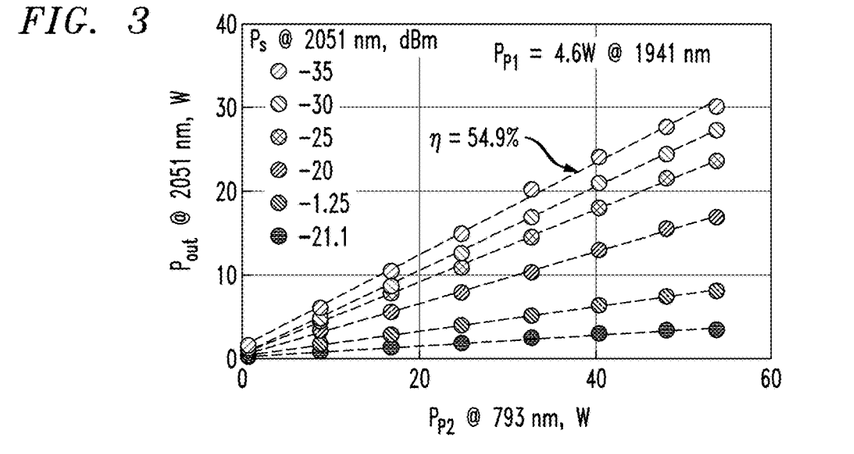
FIG. 3 is a graph of output power for the inventive hybrid amplifier, measured as a function of pump power (within the power amplifier component) for several different input signal power levels.

FIG. 3 shows the measured $P_{OUT}$ as a function of $P_{P2}$ for several values of input signal power $P_s$. The data are plotted in points and the dotted lines are linear fits to the data. For these data, the preamplifier pump power $P_{P1}$ was held constant at 4.6 W for all values of $P_{P2}$. Under these conditions, the measured values of $P_{OUT}$ was found to vary linearly with $P_{P2}$. A maximum optical-optical slope efficiency of $\eta$=54.9% (discussed in detail below in association with FIG. 4) was observed at the maximum input signal power $P_S$=+21.1 dBm. $\eta$ is defined as the change in output power divided by the change in second stage pump power, or $\eta=\Delta P_{out}/\Delta P_{P2}$. The maximum signal output power achieved with this particular three-stage amplifier configuration was 30 W, when used with fixed power pump sources. For preamplifier 42, the total pump power ($P_{P1}$) was held at 4.6 W (with a 30/70 split) and for power amplifier 44, the total pump power ($P_{P2}$) was held at 53.6 W. The slope efficiency $\eta$ shown in FIG. 3 is greater than the simple quantum limit of 793 nm/2051 nm=38.7%, clearly indicating the presence of two-for-one ion-ion interactions in double clad Tm-doped fiber 66 of power amplifier 44. It may be observed from the data that the amplifier reaches saturation at input powers $P_S \approx -10$ dBm, by extrapolating from the curves shown in FIG. 3.

Figure 4:
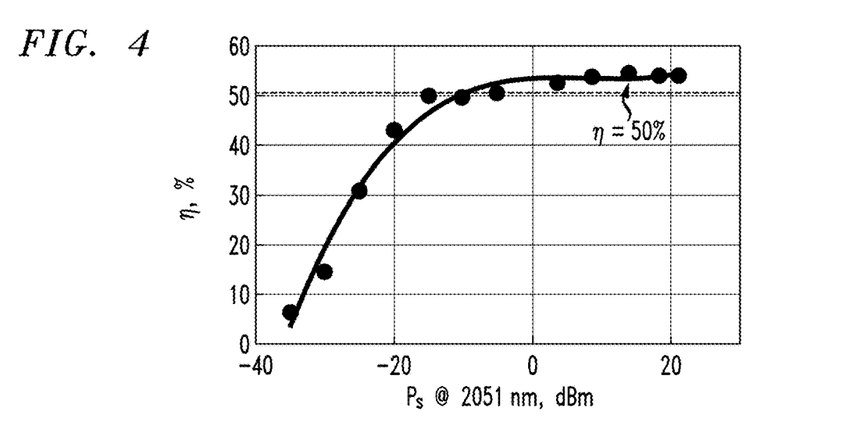
FIG. 4 plots the measured values of optical-optical slope efficiency as a function of input signal power.

FIG. 4 plots the measured values of optical-optical slope efficiency $\eta$ as a function of input signal power $P_S$ for hybrid fiber amplifier 40. As with the plots of FIG. 3, the points are the data, and the solid line is a polynomial fit to the data. Here, $P_{P1}$ was again held at the fixed value 4.6 W (recall that the preamplifier pump source operates at $\lambda_{P1}$=1941 nm) and $P_{P2}$ held at the fixed value of 53.6 W ($\lambda_{P2}$=793 nm). The rapid increase in $\eta$ as input power $P_s$ increases is caused by the high gain compression of the three-stage amplifier configuration of hybrid fiber amplifier 40. For $P_s > -10$ dBm, $\eta$ is seen to exceed 50%, demonstrating the high efficiencies and high dynamic range that can be achieved with the inventive hybrid fiber amplifier configuration.

Figure 5:
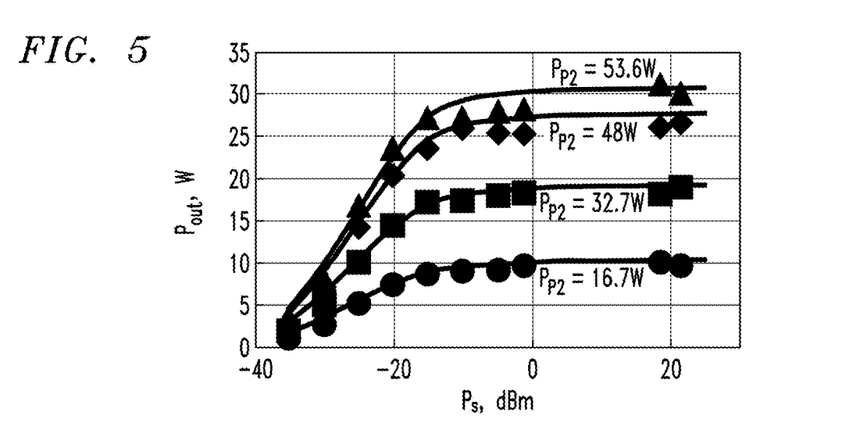
FIG. 5 contains a plot depicting the relationship between input power and output power for the inventive hybrid amplifier, as impacted by different levels of pump power used in the power amplifier portion of the hybrid arrangement.

The relationship between output power and input power as impacted by different pump power values for power amplifier 44 is shown in FIG. 5 by plotting $P_{OUT}$ as a function of $P_s$ for a fixed preamplifier pump power ($P_{P1}$=4.6 W) and four different values of $P_{P2}$ (ranging from 16.7 W to 53.6 W).

Figure 6:
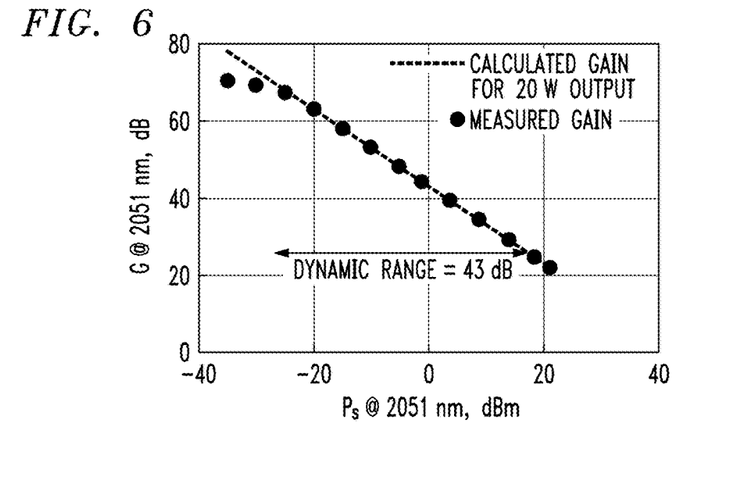
FIG. 6 is a plot of signal gain as a function of input signal power for an exemplary hybrid amplifier formed in accordance with the principles of the present invention.

FIG. 6 shows the measured values of experimental gain G vs. input signal power $P_s$ (points) and calculated values of gain (dotted line) for an output power $P_{OUT}$ of 20 W. For these data, $P_{P1}$ was again fixed at 4.6 W ($\lambda_{P1}$=941 nm). To maintain $P_{OUT}$ at the constant level of 20 W, the pump power into power amplifier 44 ($P_{P2}$) was adjusted individually for each value of input signal power $P_s$. For $P_s < -26$ dBm, an output power of 20 W could not be achieved, thus $P_{P2}$ was set to its maximum value of 53.6 W. In this case, the signal dynamic range for hybrid fiber amplifier 40 was measured to be about 43 dB for an output power of 20 W.

Figure 7:
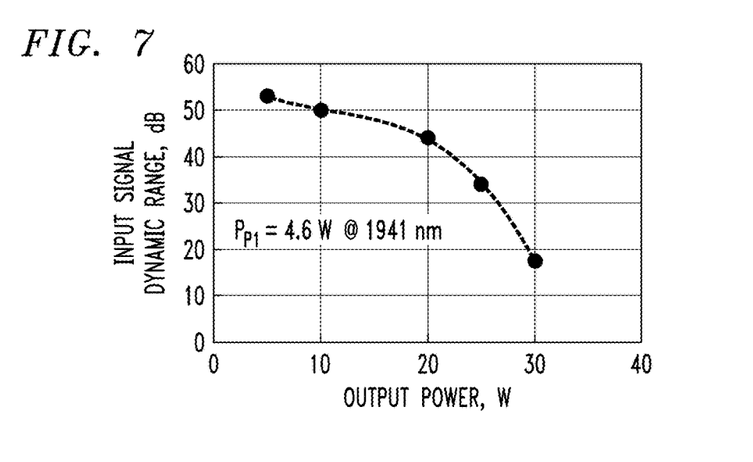
FIG. 7 contains a plot illustrating input signal dynamic range as a function of output power for the inventive hybrid amplifier.

FIG. 7 plots the input signal dynamic range as a function of $P_{OUT}$. The data are plotted in points and the dotted line is a polynomial fit to the data. Each point was obtained by measuring the dynamic range at different output powers as described for 20 W $P_{OUT}$ values shown in FIG. 6. For an output power of 25 W, the dynamic range of the input signal power is shown to have the relatively high value of 34 dB, where as the output power level is reduced, the dynamic range is shown to rise monotonically to 52 dB for an output power of 5 W. Such high values of dynamic range are important for successful amplifier operation over wide variations in input signal power. As mentioned above, most conventional semiconductor sources operating in the 2.0-2.1 µm range can only provide a relatively low output power emission, so the provision of a high dynamic range that is able to accurately amplify these lower power values is a significant achievement.

Figure 8:
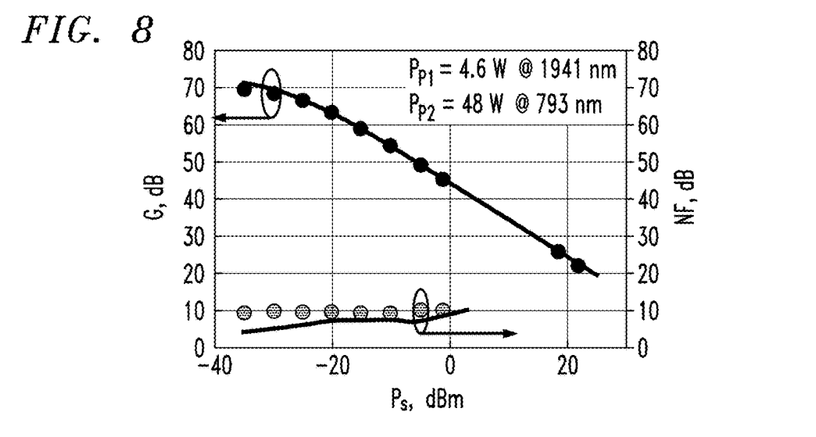
FIG. 8 contains plots of both gain and noise figure as a function of input power for various pump power levels used in both the preamplifier and power amplifier portions of the hybrid amplifier.

FIG. 8 contains plots of both gain G and noise figure NF as a function of input power $P_s$ for the indicated pump power values of $P_{P1}$ and $P_{P2}$. The data are given in points and the simulations are plotted with solid lines. For applications used sources whose average input power is typically −20 dBm, the gain plots in FIG. 8 clearly demonstrate the ability to achieve small signal gains of about 70 dB, where this may be attributed to using a multi-stage preamplifier optimized in the manner described above.

In contrast, for applications using high power input signals, the multi-stage preamplifier may be less useful, allowing for the basic configuration as shown in FIG. 1 to provide ample output power.

Figure 9:
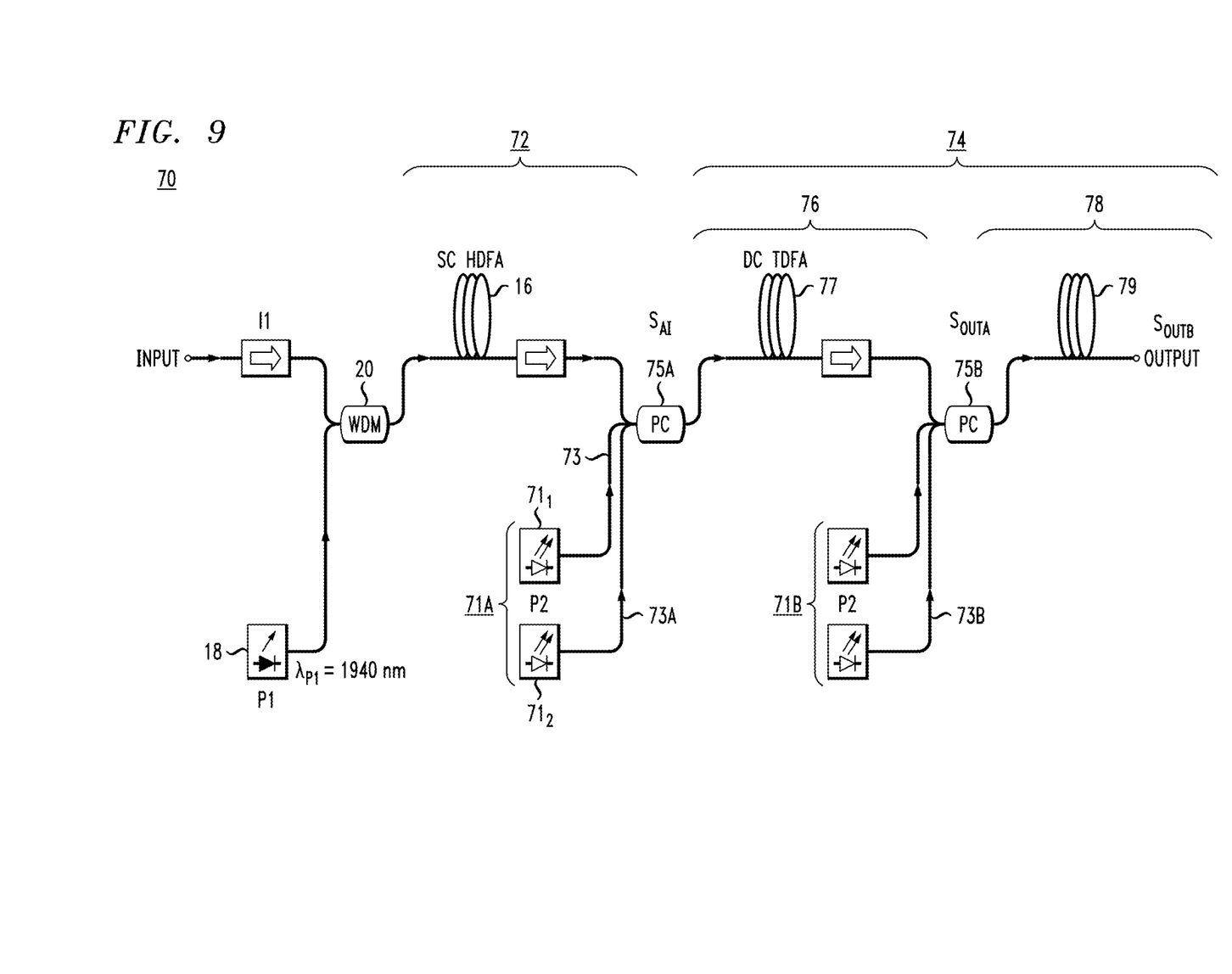
FIG. 9 illustrates yet another embodiment of the present invention, in this case comprising a multi-stage power amplifier component that is used in combination with a single stage preamplifier.

As mentioned above, various configurations of the inventive hybrid amplifier may utilize a multi-stage power amplifier. FIG. 9 illustrates one such arrangement, where a hybrid amplifier 70 is shown as comprising a multi-stage TDFA power amplifier 74 that is used in combination with a single stage HDFA preamplifier 72. Similar to the single stage HDFA preamplifier 12 discussed above, HDFA preamplifier 72 is based upon Ho-doped gain fiber 16, with a pump beam $P_{P1}$ from source 18 combined with the incoming optical signal $S_{IN}$ within WDM 20 and thereafter coupled into gain fiber 16. The low noise, broadband amplified output $S_{A1}$ from HDFA preamplifier 72 is shown as thereafter applied as an input to multi-stage TDFA power amplifier 74.

In the particular configuration of FIG. 9, multi-stage TDFA 74 is shown as comprising a pair of concatenated amplifying stages 76, 78. A first stage 76 is shown as being based upon a section of DC Tm-doped gain fiber 77, with a pair of pump sources 71A (operating at a multiwatt power level) collected within a pump combiner 75A and then provided as a cladding pump beam $P_{P2A}$ to gain fiber 77 (typically, coupled into the inner cladding of the double-clad (or triple-clad) fiber configuration). Amplified signal $S_{A1}$ is introduced into the Tm-doped core region of gain fiber 77, where the pump power, dopant concentration and length of gain fiber 77 are selected to introduce a certain amount of power to the propagating optical signal (the output from first amplifying stage 76 denoted as $S_{OUTA}$ in FIG. 9).

Second amplifying stage 78 operates in similar manner as first amplifying stage 76, although the length of its gain fiber section 79 (as well as dopant concentration) may differ from that of gain fiber 77. Pump sources 71B are shown for second stage 78 as being similar in configuration as discussed above, with a pump combiner 75B used in the same manner. However, the power level of these pump sources may differ from those used in the first stage, as desired to control the amount of power achieved at the output of the hybrid amplifier (denoted as $S_{OUTB}$ in FIG. 9).

Figure 10:
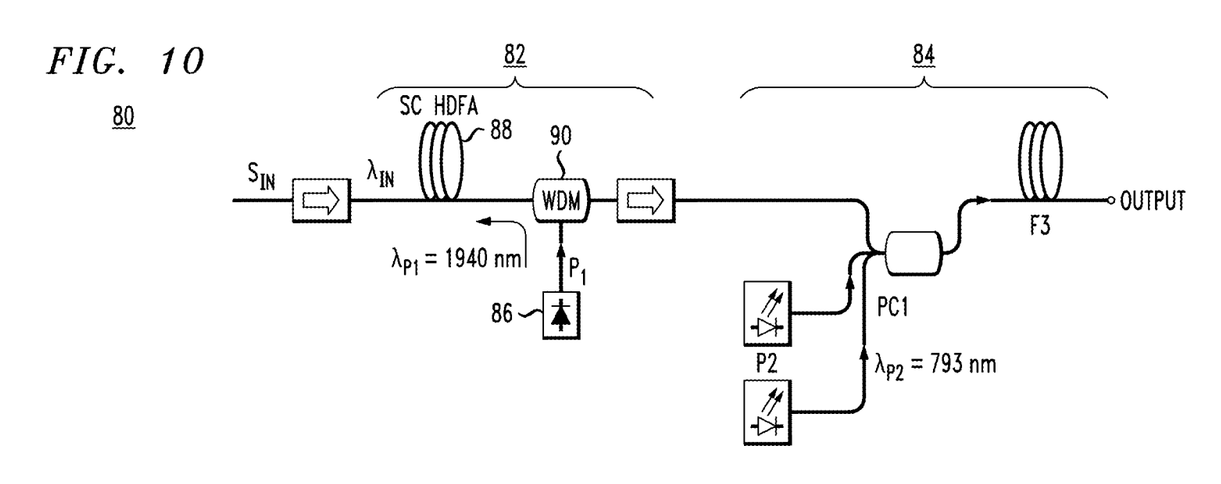
FIG. 10 shows an exemplary embodiment of the present invention where a counter-propagating pump beam is used within the preamplifier portion of the hybrid amplifier.

Various arrangements of a hybrid fiber amplifier of the present invention may alternatively use counter-propagating pump waves to provide amplification within the doped gain fibers of both the preamplifier and the power amplifier components. FIG. 10 illustrates one possible arrangement, where in this case a hybrid fiber amplifier 80 utilizes a counter-propagating pump within a preamplifier 82, while retaining the use of a co-propagating pump within a power amplifier 84. As shown, pump beam $P_1$ from a preamplifier pump source 86 is introduced into an output endface of a section of a Ho-doped gain fiber 88 via a WDM 90. Gain fiber 88 is typically a single clad fiber, with WDM 90 utilized to introduce pump beam Pi into the core region of the output endface of gain fiber 88 so that the pump beam propagates in the opposite direction of input signal $S_{IN}$, which is introduced at the input endface of gain fiber 88.

The counter-propagating arrangement of signal power vs. pump power introduces less overall gain than the co-propagating arrangements described above. However, the counter-propagating arrangement exhibits higher optical-to-optical slope efficiencies, as well as higher power conversion efficiencies, than the above-described co-propagating pump configurations. Inasmuch as preamplifier 82 is primarily configured to accept a large dynamic range of input power levels over which at least a moderate level of gain can be achieved (while maintaining a relatively low noise figure), the use of the counter-propagating pump may be a benefit in many applications.

The elements of power amplifier 84 within hybrid fiber amplifier 80 of FIG. 10 are similar to those discussed above in association with embodiments shown in FIGS. 1 and 2, and utilizes a double-clad section of Tm-doped gain fiber 92 in combination with a pair of pump sources 94₁, 94₂. A pump combiner 96 provides the total pump input to Tm-doped gain fiber 92, which also receives as an input the amplified output $S_{A1}$ from preamplifier 82. The gain achieved at the output of power amplifier 84 is known to be associated with the input powers of the pump source 94, the length $L_{Tm}$ of gain fiber 92, as well as the concentration of the Tm dopant within gain fiber 92.

Figure 11:
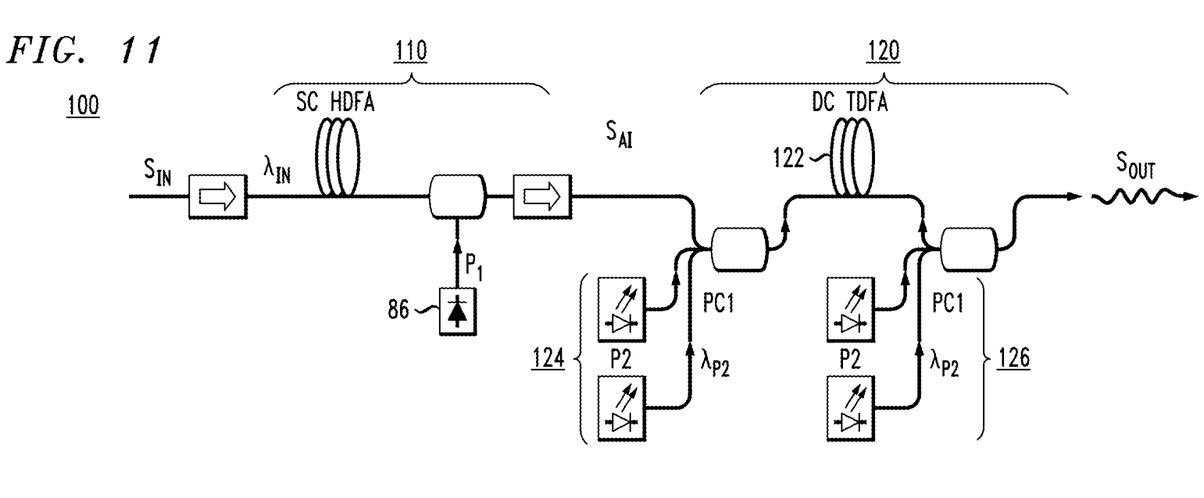
FIG. 11 illustrates another exemplary configuration of the inventive hybrid amplifier, in this case utilizing both co-propagating and counter-propagating pump beams within the power amplifier, which may be used to increase the amount of output power that is able to be delivered by the inventive hybrid amplifier.

An exemplary hybrid fiber amplifier 100 that may be used to provide an even greater level output power is illustrated in FIG. 11. Fiber amplifier 100 includes a preamplifier 110 utilizing a counter-propagating pump similar to that shown in FIG. 10. However, in this embodiment as depicted in FIG. 11, a power amplifier 120 is configured to utilize both co-propagating and counter-propagating pumps. In particular, a section of Tm-doped double clad gain fiber 122 is shown as coupled to both a set of co-propagating pump sources 124 and a set of counter-propagating pump sources 126. The ability to introduce additional pump power in this manner may be useful in many applications.

Other arrangements for providing additional output power may utilize a power amplifier that is co-doped with both Ho and Tm. Given the "hybrid" design of the present invention, the use of a co-doped gain fiber within the power amplifier allows for any residual preamplifier pump light that was not absorbed by the preamplifier's Ho-doped gain fiber to thus provide additional amplification by reacting with the Ho dopant included within the co-doped gain fiber of the power amplifier. The use of a co-doped gain fiber within the power amplifier may also eliminate the need to perhaps include a filter at the output of the preamplifier to remove residual pump, where the need to include such a filter inevitably introduces unwanted loss into the propagating signal.

Many applications may also require the amplified output signal to maintain a defined polarization (e.g., to be linearly polarized). In these cases, it is preferred to utilize polarization-maintaining (PM) optical fiber for both the preamplifier and the power amplifier. In particular, the PM fiber sections of both amplifiers need to be oriented such that signal light propagates through the associated sections of PM fiber along the "slow" fiber axis so as to be consistent with the standard industry choice for the axis of propagation.

Recall that an aspect of the present invention is to provide an extended wavelength region (within the eye-safe band) over which a high level of output power may be achieved (while maintaining a low noise figure, a high input signal dynamic range and high small signal gain). As mentioned above, the dynamic range that may be achieved for the input signal is directly related to the specific parameters of the HDFA preamplifier, particularly with respect to having the capability of providing gain across an extended bandwidth (as may be achieved in some embodiments by the use of a multi-stage preamplifier).

Figure 12:
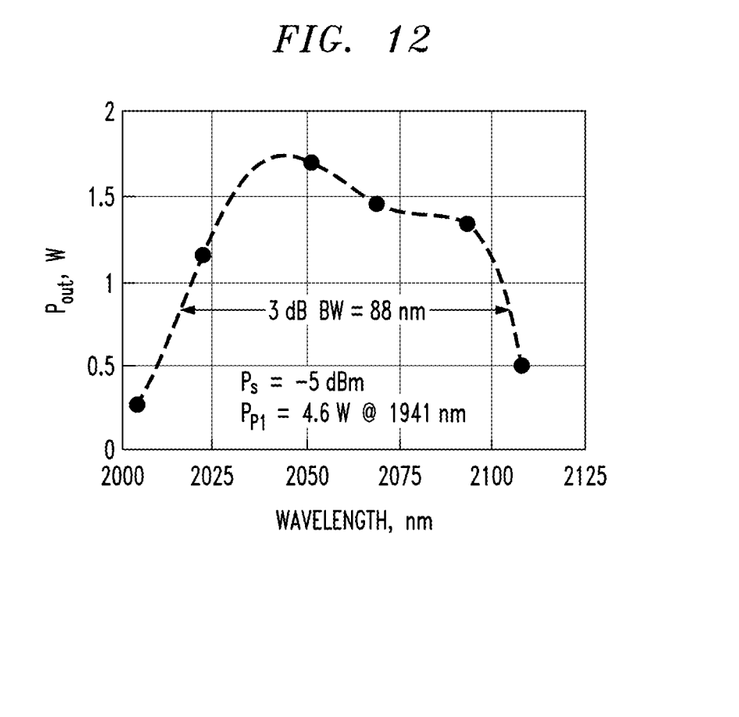
FIG. 12 is a plot showing the bandwidth that may be achieved for the preamplifier portion of the inventive hybrid amplifier.

FIG. 12 illustrates an exemplary bandwidth achieved for the HDFA preamplifier portion of an exemplary hybrid amplifier formed in accordance with the present invention. In particular, FIG. 12 plots saturated output power as a function of input signal wavelength $\lambda_s$. A set of six different wavelengths spanning the desired eye-safe wavelength range for chosen for study, with adjacent wavelengths separated by about the same amount. In particular, the data shown in FIG. 12 was measured for the set $\lambda_s=\{2004, 2022, 2051, 2069, 2093, 2108 \text{ nm}\}$, each with a power level $P_s$ held at −5 dBm. The illustrated results show that the 3 dB (50%) output power operating bandwidth of an exemplary HDFA preamplifier is approximately 88 nm (from 2016 to 2104 nm). Here, the points are data and the dashed line is a polynomial fit to the experimental data. Since the six wavelengths chosen for the measurement are equally spaced and fully cover the operating span of the inventive hybrid amplifier, the polynomial fit is expected to fairly represent the experimental spectral performance of the HDFA preamplifier. The high OSNR and wide bandwidth of the preamplifier make it an ideal source to seed a power amplifier in a MOPA configuration.

Figure 13:
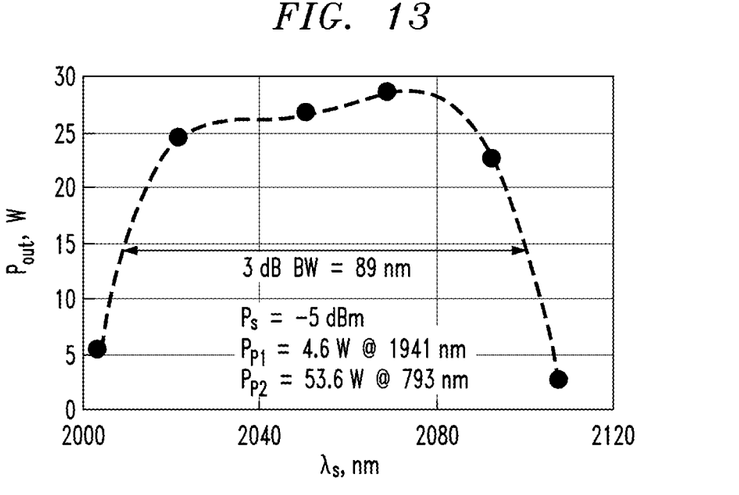
FIG. 13 is a plot of an exemplary output power bandwidth that may be provided using a hybrid amplifier of the present invention.

FIG. 13 is a plot illustrating the bandwidth of the complete hybrid amplifier, measuring output power at the same set of six input signal wavelengths as used to obtain the data of FIG. 12. In obtaining the results shown in FIG. 13, the input signal power $P_s$ was again held at −5 dBm (yielding a fully saturated amplifier), with the pump powers $P_{P1}$ and $P_{P2}$ also fixed at their maximum values. In this graph, the points are data and the dashed line is a polynomial fit as a guide to the behavior of the data. As illustrated by the horizontal arrow, the measured 3 dB (50%) output power bandwidth of the amplifier is approximately 89 nm (from 2009 to 2098 nm). This wide operating bandwidth is consistent with the measured spectral gain and absorption curves for the Ho-doped and Tm-doped fibers While certain preferred embodiments of the present invention have been illustrated and described in detail, it should be apparent that modifications and adaptations to those embodiments may occur to one skilled in the art without departing from the scope of the present invention as set forth in the claims appended hereto. Indeed, the described embodiments are to be considered in all respects as only illustrative and not restrictive.

What is claimed is:

1. An optical amplifier for operation across an eye-safe bandwidth of 2.0-2.1 µm, comprising:
    a preamplifier element formed of one or more Ho-doped fiber amplifier (HFDA) stages, the preamplifier element responsive to an input optical signal $S_{IN}$ operating at an eye-safe signal wavelength $\lambda_S$ and a first pump beam operating at a pump wavelength $\lambda_{p1}$, the preamplifier element providing as an output an amplified version of the input optical signal based upon interaction between the first pump beam and Ho dopant, the combination of the first pump beam and Ho dopant providing optical gain across a wide dynamic range of the eye-safe bandwidth; and
    a power amplifier element, coupled to the output of the preamplifier element, the power amplifier element formed of one or more Tm-doped fiber amplifier (TDFA) stages, the power amplifier element responsive to the amplified version of the input optical signal and a second pump beam operating at a pump wavelength $\lambda_{P2}$ and having a multiwatt power level, the power amplifier generating a multiwatt amplified optical output signal based upon interaction between the multiwatt second pump beam and the Tm dopant.

2. The optical amplifier as defined in claim 1 wherein at least one Ho-doped fiber amplifier (HDFA) stage comprises
    a section of optical gain fiber including a Ho-doped core region;
    a pump source providing the first pump beam at the pump wavelength $\lambda_{P1}$ associated with an absorption band of Ho ions; and
    a wavelength division multiplexer disposed at an input of the section of optical fiber, the wavelength division multiplexer responsive to the input signal $S_{IN}$ operating at the eye-safe wavelength $\lambda_S$ and the first pump beam operating at the pump wavelength $\lambda_{P1}$, coupling both inputs into the Ho-doped core of the optical gain fiber.

3. The optical amplifier as defined in claim 2 wherein the preamplifier element comprises a plurality of HDFA stages disposed in a concatenated arrangement.

4. The optical amplifier as defined in claim 3 wherein the preamplifier comprises a pair of HDFA amplifier stages.

5. The optical amplifier as defined in claim 4 wherein the pump sources for the pair of HDFA amplifier stages comprise a single laser source and a variable ratio optical power splitter, with a first output from the power splitter provided as the pump beam input to the first preamplifier stage and the second output from the power splitter provided as the pump beam input to the second preamplifier stage.

6. The optical amplifier as defined in claim 1 wherein the optical gain fiber of each HDFA stage forming the preamplifier element comprises a section of single clad, single mode optical fiber.

7. The optical amplifier as defined in claim 1 wherein the optical gain fiber of the each HDFA stage forming the preamplifier element comprises a section of single clad, polarization-maintaining optical fiber.

8. The optical amplifier as defined in claim 2 wherein the pump source is disposed such that the pump beam co-propagates with the input signal along the optical gain fiber.

9. The optical amplifier as defined in claim 2 wherein the pump source is disposed such that the pump beam counter-propagates with respect to the input signal within the optical gain fiber.

10. The optical amplifier as defined in claim 2 wherein the pump source is configured to provide a first pump beam that co-propagates with the input signal through the optical gain fiber and a second pump beam that counter-propagates through the optical gain fiber with respect to the input signal.

11. The optical amplifier as defined in claim 1 wherein at least one Tm-doped fiber amplifier (TDFA) stage of the power amplifier element comprises a section of optical gain fiber including a Tm-doped core region, an inner cladding layer and at least one outer cladding layer, the amplified output from the preamplifier element coupled into the Tm-doped core region of the power amplifier; and a multiwatt pump source providing the second pump beam at the pump wavelength $\lambda_{P2}$ associated with an absorption band of Tm ions, the second pump beam having a power sufficient to generate an output power of at least 20 W and coupled into the inner cladding layer of the TM-doped optical gain fiber.

12. The optical amplifier as defined in claim 11 wherein the section of optical gain fiber comprises a section of double-clad multimode optical fiber.

13. The optical amplifier as defined in claim 11 wherein the section of optical gain fiber comprises a section of triple-clad multimode optical fiber.

14. The optical amplifier as defined in claim 11 wherein the section of optical gain fiber comprises a section of polarization-maintaining, double-clad optical fiber.

15. The optical amplifier as defined in claim 11 wherein at least one TDFA stage is co-doped with Ho.

16. The optical amplifier as defined in claim 11 wherein the multiwatt pump source is disposed such that the second pump beam co-propagates with the amplified output from the preamplifier element along the optical gain fiber.

17. The optical amplifier as defined in claim 11 wherein the multiwatt pump source is disposed such that the second pump beam counter-propagates with respect to the amplified output from the preamplifier element within the optical gain fiber.

18. The optical amplifier as defined in claim 11 wherein the multiwatt pump source is configured to provide an additional pump beam that co-propagates with the amplified output from the preamplifier element through the optical gain fiber, the second pump beam counter-propagating through the optical gain fiber with respect to the amplified output from the preamplifier element.

* * * * *